US008157058B2

(12) United States Patent
Ach

(10) Patent No.: US 8,157,058 B2
(45) Date of Patent: *Apr. 17, 2012

(54) ELEVATOR WITH BELT-LIKE TRANSMISSION MEANS, PARTICULARLY WITH WEDGE-RIBBED BELT, AS SUPPORT MEANS AND/OR DRIVE MEANS

(75) Inventor: Ernst Friedrich Ach, Ebikon (CH)

(73) Assignee: Inventio AG, Hergiswil NW (CH)

( * ) Notice: Subject to any disclaimer, the term of this patent is extended or adjusted under 35 U.S.C. 154(b) by 137 days.

This patent is subject to a terminal disclaimer.

(21) Appl. No.: 11/755,216

(22) Filed: May 30, 2007

(65) Prior Publication Data

US 2007/0278047 A1 Dec. 6, 2007

Related U.S. Application Data

(60) Division of application No. 10/850,544, filed on May 20, 2004, which is a continuation of application No. PCT/CH02/00624, filed on Nov. 20, 2002.

(30) Foreign Application Priority Data

Nov. 23, 2001 (EP) .................................... 01811132

(51) Int. Cl.

| | |
|---|---|
| ***B66B 11/00*** | (2006.01) |
| ***B66B 11/08*** | (2006.01) |
| ***B66B 7/06*** | (2006.01) |
| ***B66D 1/30*** | (2006.01) |
| ***F16G 9/00*** | (2006.01) |
| ***F16G 1/28*** | (2006.01) |

(52) U.S. Cl. ........ 187/251; 187/254; 187/266; 474/252; 474/264; 474/266; 474/268; 254/265

(58) Field of Classification Search .......... 474/250–252, 474/270, 237, 238, 167, 249, 260, 265; 187/250–266, 414; 156/137–139; 254/265, 254/312; *B66B 7/06, 11/08, 11/00*
See application file for complete search history.

(56) References Cited

U.S. PATENT DOCUMENTS 1,729,329 A * 9/1929 Chilton ......................... 156/140
1,796,875 A * 3/1931 Radt ............................ 474/167
(Continued)

FOREIGN PATENT DOCUMENTS

EP 2199245 A1 * 6/2010
(Continued)

OTHER PUBLICATIONS

Declaration under 37 C.F.R. 1.132 of Olivier Berner, for co-pending U.S. Appl. No. 10/850,544, Nov. 22, 2010, pp. 1-16.*

*Primary Examiner* — Michael Mansen
*Assistant Examiner* — Stefan Kruer
(74) *Attorney, Agent, or Firm* — Fraser Clemens Martin & Miller LLC; William J. Clemens

(57) ABSTRACT

A transmission belt for driving and/or supporting an elevator car has a longitudinally extending body including an area tensile layer reinforced by chemical fibers. The belt can have a flat friction layer or a friction layer including alternating longitudinally extending wedge-shaped ribs and grooves. Transverse grooves can be formed across the width of the longitudinally grooved friction layer.

20 Claims, 14 Drawing Sheets

U.S. PATENT DOCUMENTS

| | | | | | |
|---|---|---|---|---|---|
| 2,472,513 | A * | 6/1949 | Bergquist | 474/167 |
| 2,728,239 | A | 12/1955 | Adams, Jr. | |
| 3,174,585 | A | 3/1965 | Tofanelli | |
| 3,643,518 | A * | 2/1972 | Semin et al. | 474/139 |
| 3,980,174 | A * | 9/1976 | Conrad | 198/835 |
| 4,900,294 | A * | 2/1990 | Schneeberger | 474/167 |
| 4,904,232 | A | 2/1990 | Kitahama et al. | |
| 4,981,462 | A * | 1/1991 | White et al. | 474/238 |
| 5,076,398 | A | 12/1991 | Heikkinen | |
| 5,191,920 | A | 3/1993 | McGregor | |
| 5,361,873 | A | 11/1994 | de Jong et al. | |
| 5,429,211 | A | 7/1995 | Aulanko et al. | |
| 5,753,369 | A * | 5/1998 | Kawashima et al. | 428/396 |
| 6,068,087 | A | 5/2000 | Moncini | |
| 6,138,799 | A | 10/2000 | Schroder-Brumloop et al. | |
| 6,345,695 | B1 | 2/2002 | Fargo et al. | |
| 6,419,605 | B1 * | 7/2002 | Takahashi et al. | 474/237 |
| 6,595,883 | B1 | 7/2003 | Breed et al. | |
| 6,893,719 | B1 | 5/2005 | Nakajima et al. | |
| 7,367,431 | B2 * | 5/2008 | Ach | 187/255 |
| 7,661,514 | B2 * | 2/2010 | Ach | 187/251 |
| 7,757,817 | B2 * | 7/2010 | Ach | 187/251 |
| 7,882,935 | B2 * | 2/2011 | Ach | 187/251 |
| 2003/0121729 | A1 | 7/2003 | Heinz et al. | |
| 2011/0088981 | A1 * | 4/2011 | Urbani et al. | 187/251 |

FOREIGN PATENT DOCUMENTS

| | | |
|---|---|---|
| WO | WO 98/29327 | 7/1998 |
| WO | WO 99/43592 | 9/1999 |
| WO | WO 99/43602 | 9/1999 |
| WO | WO 00/37738 | 6/2000 |

* cited by examiner

ELEVATOR WITH BELT-LIKE TRANSMISSION MEANS, PARTICULARLY WITH WEDGE-RIBBED BELT, AS SUPPORT MEANS AND/OR DRIVE MEANS

CROSS-REFERENCE TO RELATED APPLICATION

This application is a divisional application of the co-pending U.S. patent application Ser. No. 10/850,544, filed May 20, 2004, which is a continuation of PCT patent application serial no. PCT/CH02/00624, filed Nov. 20, 2002.

BACKGROUND OF THE INVENTION

The present invention relates generally to an elevator system and particularly to a belt-like transmission means.

Elevator systems of this kind usually comprise an elevator car, which is movable in an elevator shaft or freely along guide equipment. For producing the movement the elevator system comprises a drive which cooperates with the elevator car and a compensating weight (also termed counterweight) by way of transmission means.

Distinction is made between elevator systems in which steel cables of round cross-section are used as transmission means and more modern elevator systems that have flat belts as transmission means.

An example of an elevator system with flat transmission means is shown in PCT Patent Application WO 99/43602. The elevator car according to this patent application is moved by a drive that is seated at the compensating weight and moves together with the weight.

The described system has the disadvantage that the belt used as the transmission means does not have the optimum traction behavior achievable with specific other belt-like transmission means and that the supply of energy to the drive motor, as also the transmission of signals from associated control and regulating devices, has to take place by way of long, flexible cables.

A further elevator system with a cogged-belt-like transmission means is shown in PCT Patent Application WO 99/43592. In the described arrangement the drive is integrated in the counterweight and a cogged-belt-like transmission means fixed in the elevator shaft serves for transmission of the drive force between counterweight and elevator shaft. Since the elevator car and the compensating weight hang at an actual support means separate from the mentioned cogged-belt-like transmission means; the drive and transmission means transmit only the force difference between the counterweight and the weight of the elevator car.

This system has the same disadvantages as that described in the foregoing and has the additional disadvantage that a cogged belt is used for the drive function and a different means for the support function. By comparison with a system in which the drive function and support function are effected by the same means, in this system there is also required a greater number of rollers or pulleys.

Another form of elevator system with a cogged-belt-like transmission means is shown in U.S. Pat. No. 5,191,920. In the illustrated elevator system the cogged-belt-like transmission means is stationary in the elevator shaft. The drive unit is disposed at the elevator car or at the so-termed load receiving means.

This system therefore has the same disadvantages as described in WO 99/43602. An additional disadvantage here is that due to the elevator drive the weight of the load receiving means and thus the drive power required are increased.

The belts disclosed in the above-identified documents have specific disadvantages. Flat belts have, in elevator equipment with elevator cars which are light by comparison with the useful load, an insufficient traction capability. In the case of cogged belts the problem exists that these do not slip on the drive pulley when the elevator car or the counterweight rests, as a consequence of a control breakdown, on their end position buffers. Moreover, centering of the belt on the belt pulleys cannot be realized without problems. In a given case special measures have to be undertaken at the pulleys in order to prevent the belt from running out of the central position.

SUMMARY OF THE INVENTION

An object of the present invention is creating an improved elevator system of the kind stated above that reduces or avoids the disadvantages of the known systems.

The elevator system according to the present invention comprises an elevator car, a drive, a belt-like transmission means, preferably a wedge-ribbed belt, and a counterweight. The drive is stationary and the transmission means co-operate with the drive in order to move the elevator car by transmission of a force.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

In the following embodiments of an elevator system according to the present invention there are preferably used so-termed wedge-ribbed belts, also called wedge rib belts. Such a wedge-ribbed belt can advantageously be used as a friction-coupling (adhesion-coupling) support element and/or drive element (transmission means) for an elevator car with a counterweight. The wedge-ribbed belt enables, in the case of running characteristics similar to a flat belt, a higher cable force ratio due to its form. In the case of a belt driven by a belt pulley a high cable force ratio means that the tensile force in the run of the belt running (drawn) onto the belt pulley can be substantially higher than in the run simultaneously running away from the belt pulley. With use of a wedge-ribbed belt as a transmission means for an elevator car with a counterweight this advantage has the result that even an elevator car of very light construction can cooperate with a much heavier counterweight without the transmission means slipping on the drive pulley.

Figure 13:
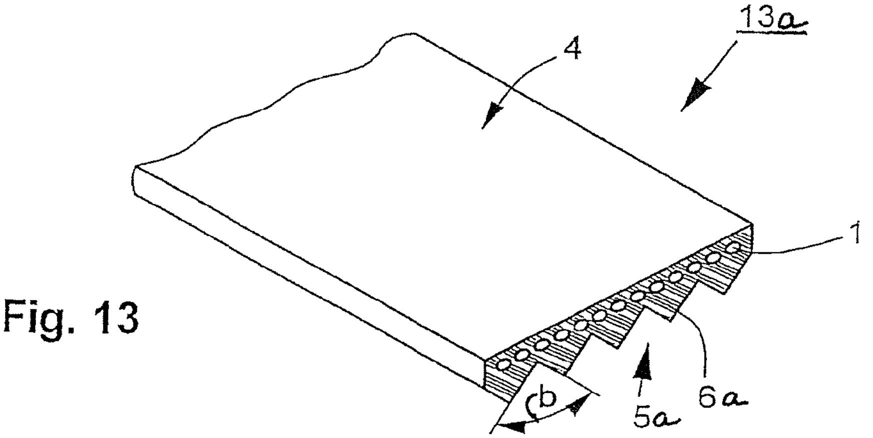
FIG. 13 is a perspective sectional view of a first embodiment of the wedge-ribbed belt used in the various embodiments of the elevator system according to the present invention.
Figure 14:
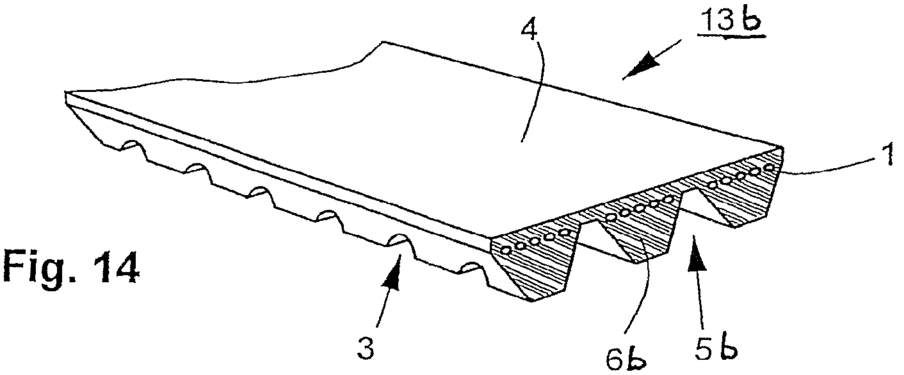
FIG. 14 is a perspective sectional view of a second embodiment of the wedge-ribbed belt used in the various embodiments of the elevator system according to the present invention.
Figure 15:
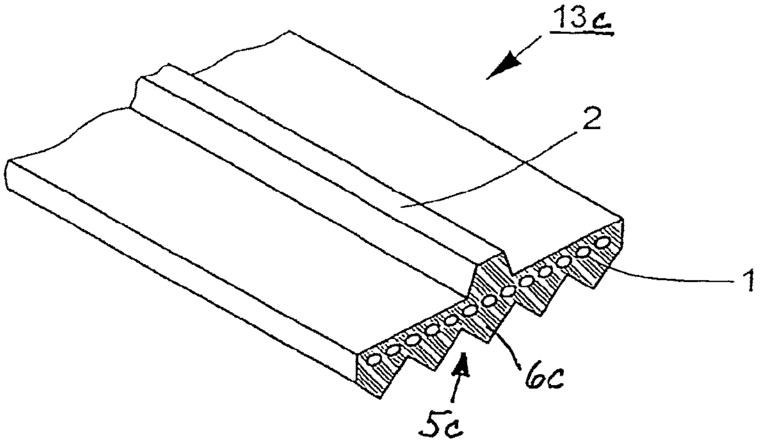
FIG. 15 is a perspective sectional view of a third embodiment of the wedge-ribbed belt used in the various embodiments of the elevator system according to the present invention.

As shown in FIGS. 13 to 15, a wedge-ribbed belt 13*a*, 13*b*, 13*c* has a longitudinally extending body with a front side with several wedge-shaped grooves 5*a*, 5*b*, 5*c* respectively and alternating with wedge ribs 6*a*, 6*b*, 6*c* respectively arranged in parallel in a longitudinal direction. These wedge-shaped grooves 5*a*, 5*b*, 5*c* and wedge ribs 6*a*, 6*b*, 6*c*, due to their wedge effect, provide a cable force ratio of more than “2” for a looping angle of 180°.

It is a further advantage of the wedge-ribbed belt 13*a*, 13*b*, 13*c* that it is self-centering on the pulleys driving or guiding it. The wedge-ribbed belt 13*c* is preferably provided on a rear side (i.e. on the side which does not have any wedge-shaped grooves 5*c* or wedge ribs 6*c*) with a guide rib 2, as shown in FIG. 15. This guide rib 2 has the task, in the case of opposite bending of the wedge-ribbed belt, i.e. when this runs around a pulley by the belt rear side oriented towards the pulley, of guiding the wedge-ribbed belt in a guide groove present in the running surface of the pulley.

It is of advantage for the use according to the present invention if the wedge-shaped grooves of the wedge-ribbed belt, the grooves 5*a* of the belt 13*a* for example, have a groove angle “b” of 80° to 100°. The groove angle “b” is preferably approximately 90°. This groove angle “b” is substantially larger than in conventional wedge-ribbed belts. Due to the larger groove angle “b” there is achieved a reduction in running noise. The self-centering characteristic is, however, retained, as is an increased cable force ratio as defined in the foregoing.

In a further form of the present invention, the wedge-ribbed belt 13*a* is provided on the rear side, as shown in FIG. 13, with a layer 4 which preferably has good sliding properties. This layer 4 can be, for example, a fabric layer. This facilitates mounting in the case of elevator systems with multiple suspension.

The wedge-ribbed belt 13*b* shown in FIG. 14 has not only the wedge-shaped grooves 5*b* and the ribs 6*b*, which are laid in a longitudinal direction, but also transverse grooves 3. These transverse grooves 3 improve the bending flexibility of the wedge-ribbed belt so that this can cooperate with belt pulleys with reduced diameter.

In FIGS. 13, 14 and 15 it can also be recognized that the transmission means (wedge-ribbed belt 13*a*, 13*b*, 13*c*) contains tensile carriers 1 which are oriented in the longitudinal direction thereof and which consist of metallic strands (for example, steel strands) or non-metallic strands (for example, of chemical fibers). Such tensile carriers 1 impart to the transmission means according to the present invention the requisite tensile strength and/or longitudinal stiffness. A preferred form of embodiment of the transmission means contains tensile carriers 1 formed of “ZYLON” fibers. “ZYLON” is a trade name of the company Toyobo Co. Ltd., Japan, and concerns chemical fibers of poly (p-phenylene-2,6-benzobisoxazole) (PBO). These fibers exceed, in terms of the characteristics decisive for the application according to the present invention, those of steel strands and of other known fibers. The elongation and the meter weight of the transmission means can be reduced by use of “ZYLON” fibers, wherein the breakage strain at the same time turns out to be higher.

Ideally, the tensile carriers 1 should be so embedded in the wedge-ribbed belt that adjacent fibers or strands are not in contact. A degree of filling, i.e. a ratio between the overall cross-section of all tensile carriers and the cross-section of the belt, of at least 20% has proved ideal.

Figure 16:
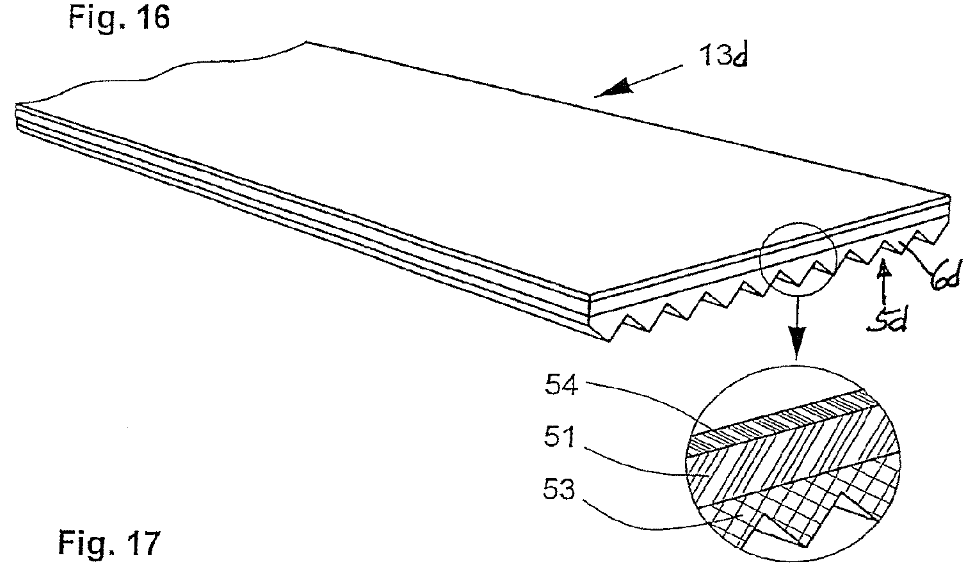
FIG. 16 is a perspective sectional view of a fourth embodiment of the wedge-ribbed belt used in the various embodiments of the elevator system according to the present invention.

FIG. 16 shows another embodiment, a wedge-ribbed belt 13*d*, that is equally suitable as a transmission means for elevator systems. Instead of the tensile carriers 1, which were mentioned in connection with the belts shown in FIGS. 13 to 15, of metallic or non-metallic strands, here an area, a tensile layer 51, forms the core of the wedge-ribbed belt 13*d*, wherein this tensile layer 51 extends substantially over the entire belt length and the entire belt width. The tensile layer 51 can consist of an unreinforced material layer, for example of a polyamide film, or of a film reinforced by chemical fibers. Such a reinforced film could contain, for example, the aforementioned "ZYLON" fibers embedded in a suitable synthetic material matrix.

The tensile layer 51 imparts to the flat belt 13*d* the requisite tensile strength and creep resistance, but is also sufficiently flexible in order to be able to bear a sufficiently high number of bending processes during deflection around a belt pulley. A wedge-ribbed layer 53, including wedge-shaped grooves 5*d* and ribs 6*d*, can consist of, for example, polyurethane or of an NBR elastomer (Nitrile Butadiene Rubber) and is connected over the whole area or pad of the area and directly or by way of an intermediate layer with the tensile layer 51. The rear side of the wedge-ribbed belt has a cover layer 54 which, like the wedge-ribbed layer, is connected with the tensile layer 51 and which is advantageously executed as a slide covering. Intermediate layers (not illustrated here) can be present between the stated principal layers, which intermediate layers impart the necessary adhesion between the stated layers and/or increase the flexibility of the transmission means. This wedge-ribbed belt provided with the whole-area tensile layer 51 can also have the guide rib 2 as already described in connection with FIG. 15.

Figure 17:
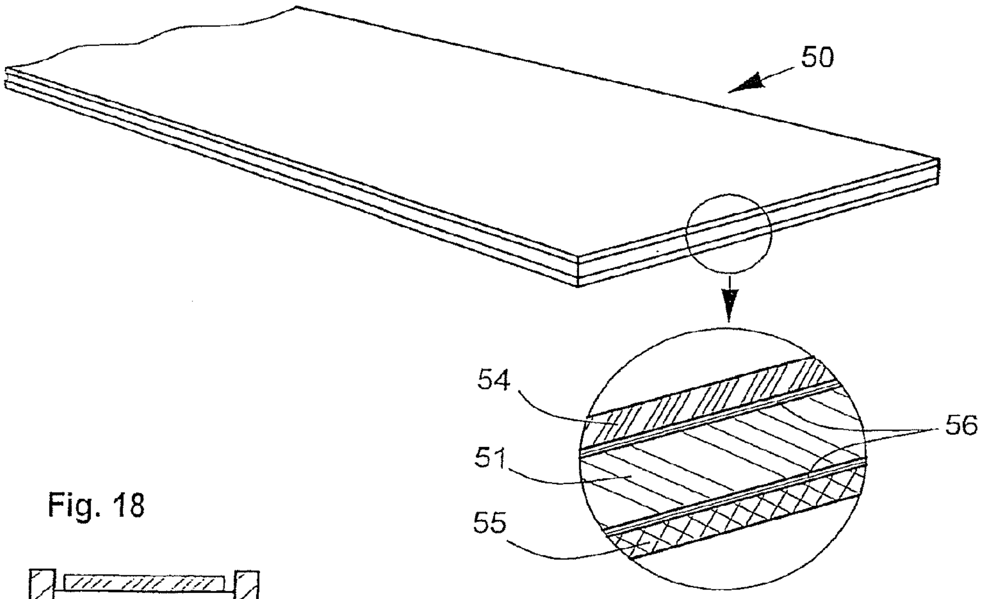
FIG. 17 is a perspective sectional view of a flat belt used in the various embodiments of the elevator system according to the present invention.
Figure 18:
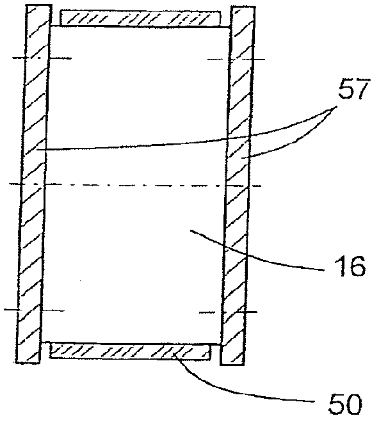
FIG. 18 is a schematic sectional view of the belt pulley with flange discs used in the various embodiments of the elevator system according to the present Invention.

A further embodiment of the transmission means which is usable in elevator systems and which is suitable for fulfilling the task according to the present invention is illustrated in FIG. 17 as a flat belt 50 with a longitudinally extending body built up from several layers of different materials. The flat belt 50 contains in the core at least one area, the tensile layer 51, which consists of, for example, an unreinforced polyamide film or of a synthetic material film reinforced with chemical fibers embedded in the synthetic material matrix. This tensile layer 51 imparts to the flat belt the requisite tensile strength and creep resistance, but is also sufficiently flexible in order to be able to bear a sufficiently high number of bending processes during deflection around a belt pulley. In addition, the flat belt 50 has an external friction layer 55 at the front side, for example of an NBR elastomer (Nitrile Butadiene Rubber); as well as the external cover layer 54 at the rear side, which is executed, depending on the respective elevator system, as a friction covering or a slide covering. Intermediate layers 56 can be present between the stated principal layers, which intermediate layers impart the requisite adhesion between the stated layers and/or increase the flexibility of the flat belt. For the purpose of optimization of the aforementioned cable force ratio, friction layers with coefficients of friction of 0.5 to 0.7 relative to steel pulleys are available, which are, moreover, very wear-resistant. Lateral guidance of the flat belt 50 is usually ensured, as illustrated in FIG. 18, by flange discs 57 mounted at a pulley 16, possibly in combination with a dishing of the pulley running surfaces (not shown).

Figure 19:
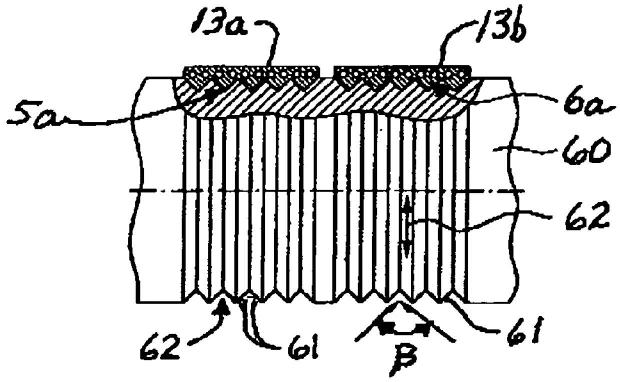
FIG. 19 is an elevation view in partial cross-section of two of the belts shown in FIG. 13 engaged with a pulley.
Figure 20:
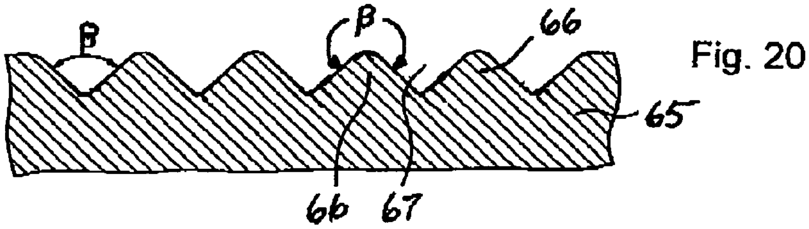
FIG. 20 is partial cross-sectional view of a pulley for use with the belt shown in FIG. 14.
Figure 21:
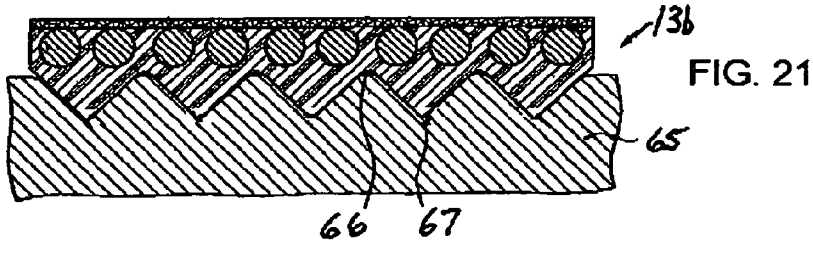
FIG. 21 is view similar to FIG. 19 with the belt shown in FIG. 14 engaged with the pulley.

As shown in FIG. 19, the belt 13*a* of FIG. 13 engages a grooved surface of an elevator drive pulley 60. The pulley 60 has alternating ribs 61 and grooves 62 that are complementary to the wedge grooves 5*a* and wedge ribs 6*a* respectively of the belt 13*a*. Thus, a groove angle "B" of the groove 62 is the same as the wedge groove angle "b" of the groove 5*a* and the wedge groove angle "b" is maintained when the belt 13*a* is engaged with the surface of the drive pulley 60. There is shown in FIGS. 20 and 21, a drive pulley 65 for use with the belt 13*b* shown in FIG. 14. The pulley 65 has alternating ribs 66 and grooves 67 that are complementary to the wedge grooves 5*b* and wedge ribs 6*b* respectively of the belt 13*b*. Thus, a groove angle "B" of the groove 67 is the same as the wedge groove angle "b" of the groove 5*b* and the wedge groove angle "b" is maintained when the belt 13*b* is engaged with the surface of the drive pulley 65.

Figure 1A:
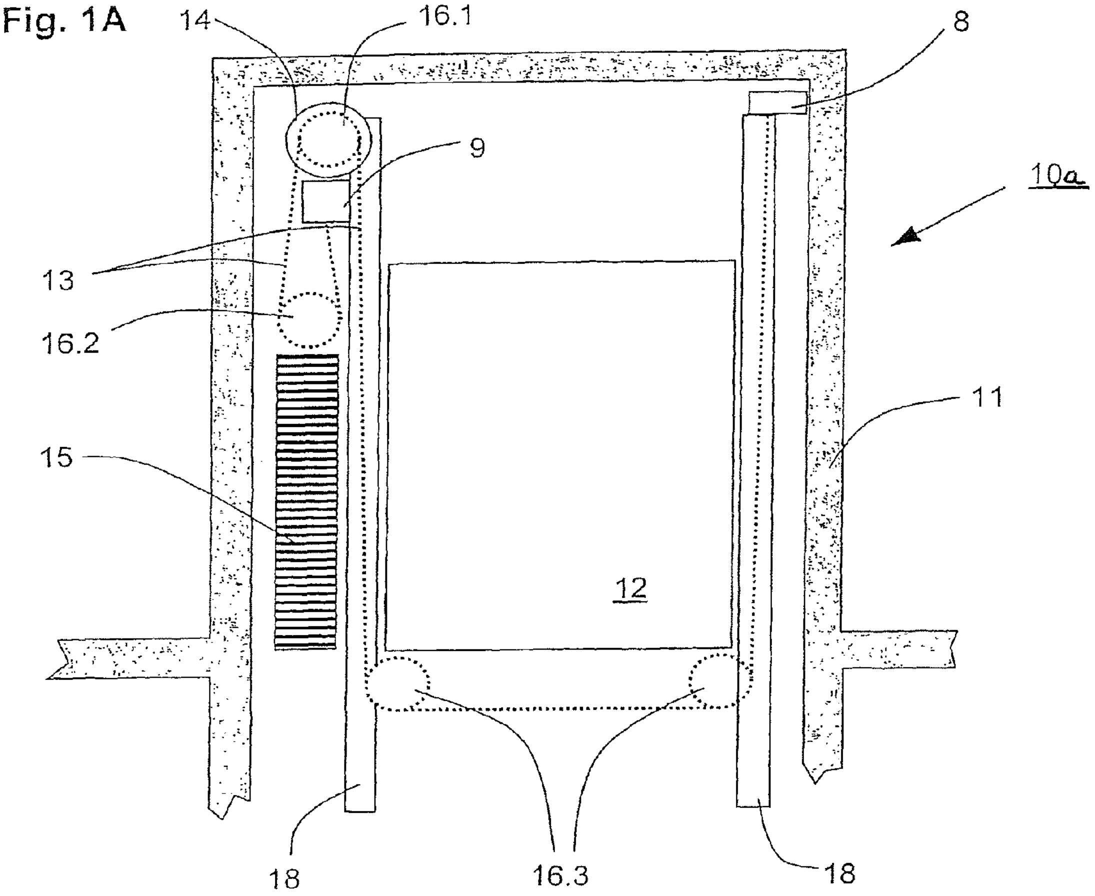
FIG. 1A is a schematic sectional rear elevation view of a first embodiment of an elevator system according to the present invention with a wedge-ribbed belt as a transmission means.
Figure 1B:
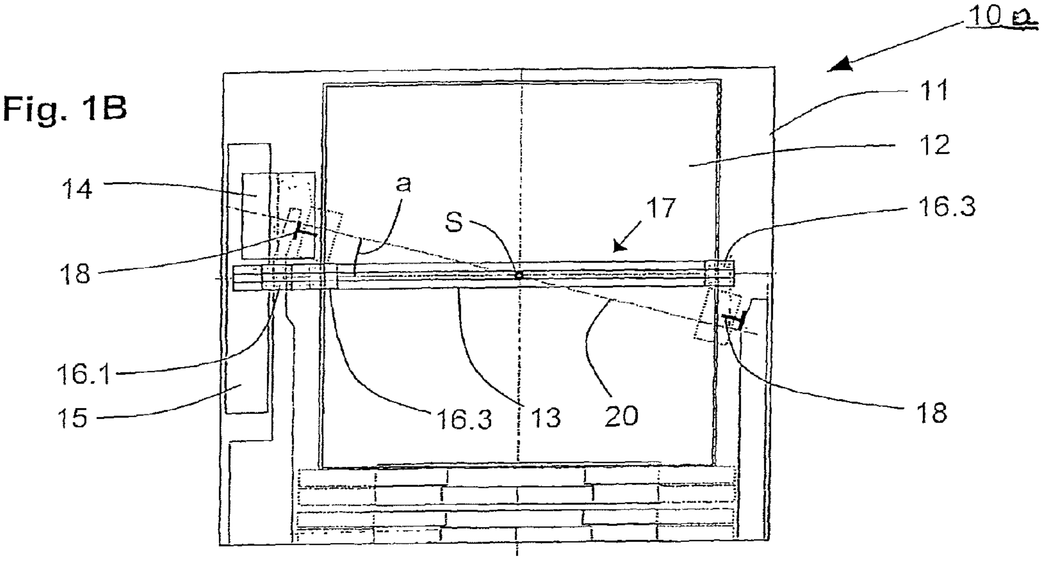
FIG. 1B is a schematic bottom plan view of the elevator system shown in FIG. 1A.

A first embodiment of an elevator system 10*a* according to the present invention is illustrated in FIGS. 1A and 1B. FIG. 1A shows a section through the head end of an elevator shaft 11. An elevator car 12 and a counterweight 15 are moved within the shaft 11 by way of a wedge-ribbed belt transmission means 13 which can be any of the belts 13*a* through 13*d* described above. For this purpose there is provided a stationary drive 14 which acts on the wedge-ribbed belt transmission means 13 by way of a drive pulley 16.1. The drive 14 is mounted on a bracket 9 that is supported on or at one or more guide rails 18 of the elevator system. In the alternative, the bracket 9 can be supported in or at the shaft wall. The wedge-ribbed belt transmission means 13 is fixed at one of its ends in the region of the bracket 9, leads from this fixing point downwardly to a suspension pulley 16.2 of the counterweight 15, loops around this suspension pulley 16.2, leads upwardly to the drive pulley 16.1, loops around this pulley, leads downwardly to a first deflecting pulley 16.3 mounted below the elevator car 12, from there leads horizontally below the elevator car 12 to a second deflecting pulley 16.3 mounted below the elevator car 12, and subsequently leads upwards again to a second fixing point designated as a support structure 8. Depending on the respective direction of rotation of the drive 14 the car 12 is moved upwardly or downwardly by way of the wedge-ribbed belt transmission means 13.

A guide plane 20 extending between the two car guide rails 18 is, as shown in FIG. 1B, turned through an angle "a" of 15° to 20° relative to the strand of the wedge-ribbed belt transmission means 13 running below the elevator car 12, i.e. relative to the transverse axis of the elevator car 12. The car guide rails 18 can thereby be placed outside the space occupied by the wedge-ribbed belt transmission means 13 and the belt pulleys, whereby it is achieved that on the one hand the axis of the strand of the wedge-ribbed belt transmission means 13 running below the elevator car 12 can be arranged underneath a car center of gravity S when this lies in the guide plane 20 formed by the car guide rails 18. In addition, the occupied shaft width is thus minimized.

With the arrangement of the strand, which runs below the elevator car 12, of the wedge-ribbed belt transmission means 13 below the car center of gravity S the guide forces arising between elevator car 12 and car guide rails 18 are kept as small as possible in normal operation and due to the fact that the center of gravity S lies in the guide plane 20 the guide forces are minimized when the safety brakes (not shown) act on the car guide rails 18.

In the case of the illustrated arrangement of the wedge-ribbed belt transmission means 13, the suspension pulley 16.2 and the deflecting pulleys 16.3, which are mounted below the elevator car 12, there results a ratio of wedge-ribbed belt speed to car and counterweight speed of 2:1 (2:1 suspension). By comparison with a 1:1 suspension the torque to be applied by the drive 14 is thereby reduced by half.

Figure 2:
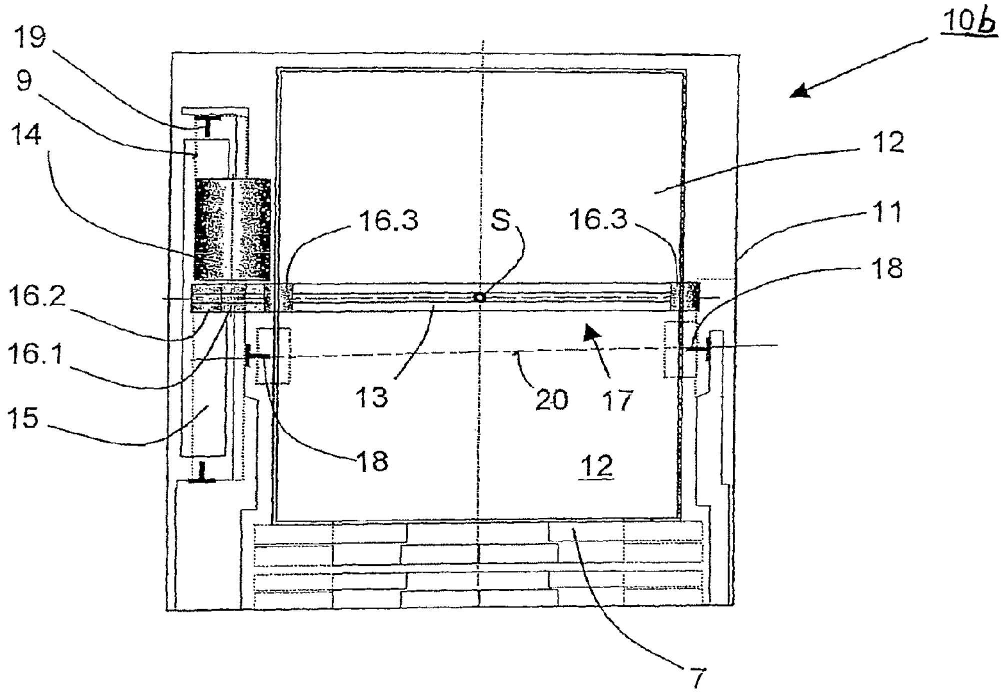
FIG. 2 is a schematic bottom plan view of a second embodiment of an elevator system according to the present invention with a wedge-ribbed belt as a transmission means.

Since the minimum radius, which is required in the case of wedge-ribbed belts, of drive and deflecting pulleys is substantially smaller than in the case of the steel wire support cables previously usual in elevator construction, several advantages result. Thanks to an appropriately reduced diameter of the drive pulley 16.1, the torque required at the drive 14 and thus the dimensions of the drive are reduced. As a result, and thanks to the deflecting pulleys 16.1 and 16.3 similarly reduced in their diameters, the form of construction and arrangement of the elevator as illustrated in FIGS. 1 and 2 is relatively compact and can be accommodated, as shown, in the shaft 11. The small size of the deflecting pulleys 16.3, which are mounted at the car 12, allows the substructure, which is usually designated as a base 17, below the elevator car 12 in which these deflecting pulleys 16.3 are installed to be constructed with small dimensions. Preferably, this base 17 together with the deflecting pulleys 16.3 can even be integrated in the car floor.

A cross-section through a similar second embodiment elevator system 10*b* is shown in FIG. 2. The elevator car 12 is moved within the shaft 11 by way of the wedge-ribbed belt transmission means 13. For this purpose there is provided the stationary drive 14 which drives the wedge-ribbed belt transmission means 13. Several pulleys are provided in order to correspondingly guide the wedge-ribbed belt transmission means 13. In the illustrated example the drive 14 is mounted in a stationary location above the upper end position of the counterweight 15. The drive 14 is mounted on the bracket 9 which is supported on or at one or more of the guide rails 18 of the elevator system 10*b*. In the illustrated example the base 17 lies at right angles to the side walls of the elevator shaft 11 in the plane of the drawing. Due to the arrangement of the wedge-ribbed belt transmission means 13 below the car center of gravity S only small guide forces arise at the car guide rails 18. This second embodiment 10*b* is otherwise substantially the same as the first embodiment 10*a*. The car guide rails 18 are arranged eccentrically, i.e. the guide plane 20 is disposed between a car door 7 and the center of gravity S of the elevator car 12, which in the illustrated case lies on the center axis of the wedge-ribbed belt transmission means 13. In the illustrated embodiment the counterweight 15 is suspended 2:1 (2:1 suspension) by the suspension pulley 16.2 and the car 12 with the deflecting pulleys 16.3.

Figure 3:
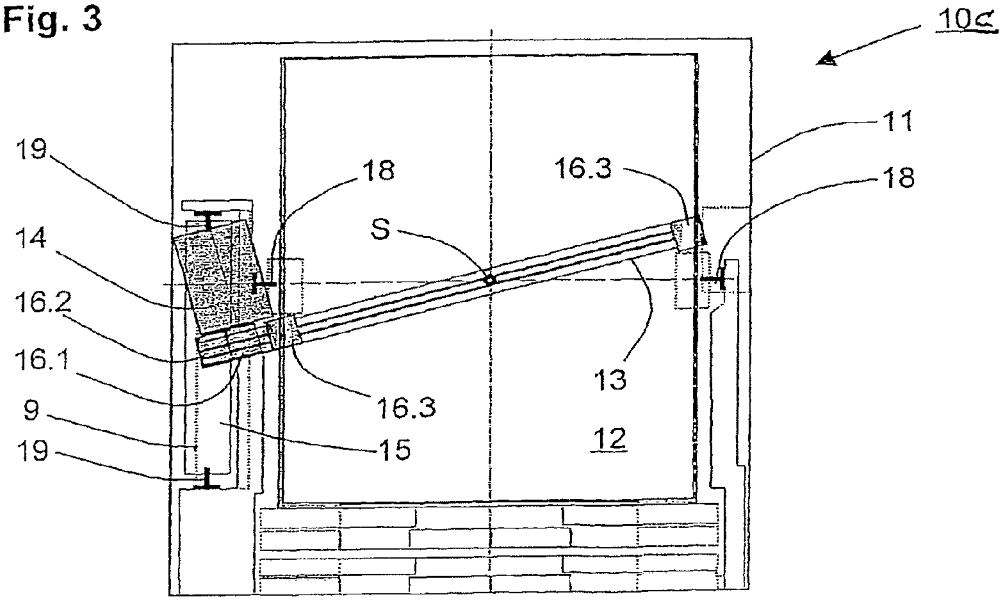
FIG. 3 is a schematic bottom plan view of a third embodiment of an elevator system according to the present invention with a wedge-ribbed belt as a transmission means.

FIG. 3 shows a cross-section through a third embodiment of an elevator system 10*c*. The drive 14 is supported on counterweight rails 19 and on one of the car rails 18. On the opposite side the fixing point of the wedge-ribbed belt transmission means 13 is supported on the second car rail 18. The car 12 and the counterweight 15 are also suspended 2:1 in this form of embodiment. The diagonal course of the wedge-ribbed belt transmission means 13 makes the advantages described in connection with the embodiment 10*b* of FIG. 2 possible for the car 12 which is centrally guided and centrally suspended with respect to the car center of gravity S.

Figure 4:
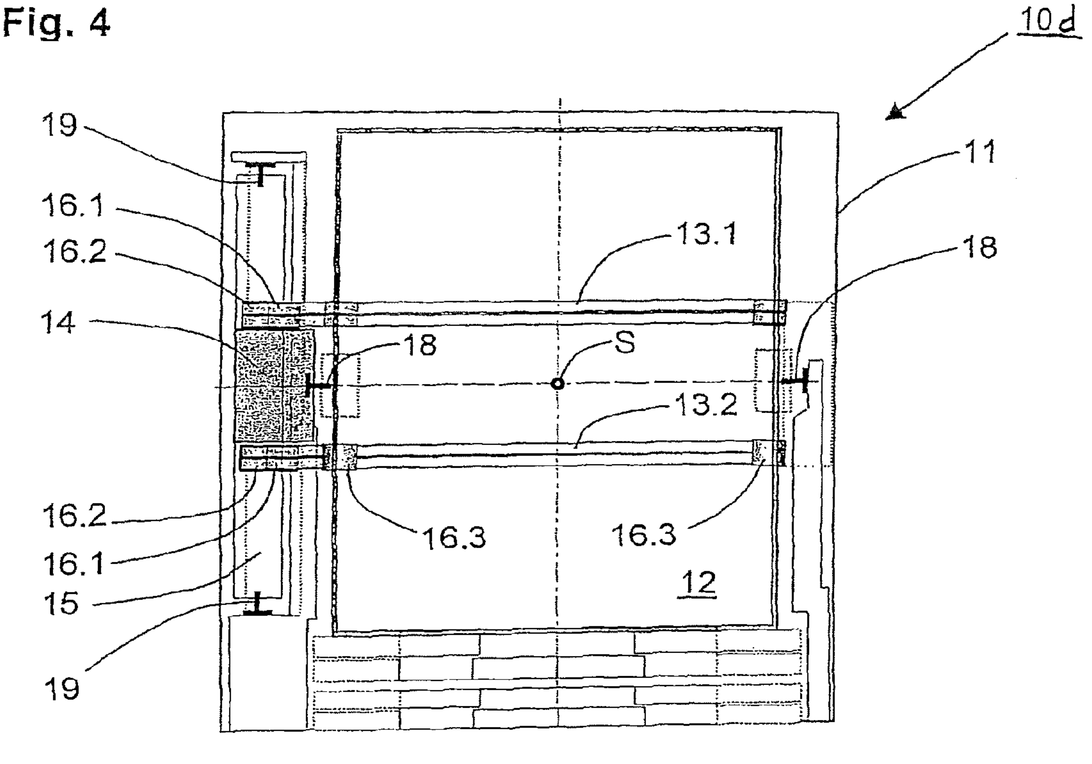
FIG. 4 is a schematic bottom plan view of a fourth embodiment of an elevator system according to the present invention with a wedge-ribbed belt as a transmission means.

In the case of a fourth embodiment elevator system 10*d*, which is shown in FIG. 4, the drive 14 is supported on the two counterweight rails 19 and on the adjacent elevator rail 18. On the opposite side, the fixing point for the ends, which are to be fixed here, of the wedge-ribbed belt transmission means 13 is supported on the second car rail 18. The drive 14 is connected with two of the drive pulleys 16.1. Two strands of wedge-ribbed belt transmission means 13.1 and 13.2, which run parallel to one another, are provided. In this embodiment, also, the car 12 and the counterweight 15 are suspended 2:1. The division of the wedge-ribbed belt transmission means into the two parallel strands 13.1 and 13.2 enables a central guidance and a suspension, which is central with respect to the car center of gravity S, of the elevator car 12 with the advantages described in connection with the embodiment 10*b* of FIG. 2.

Figure 5A:
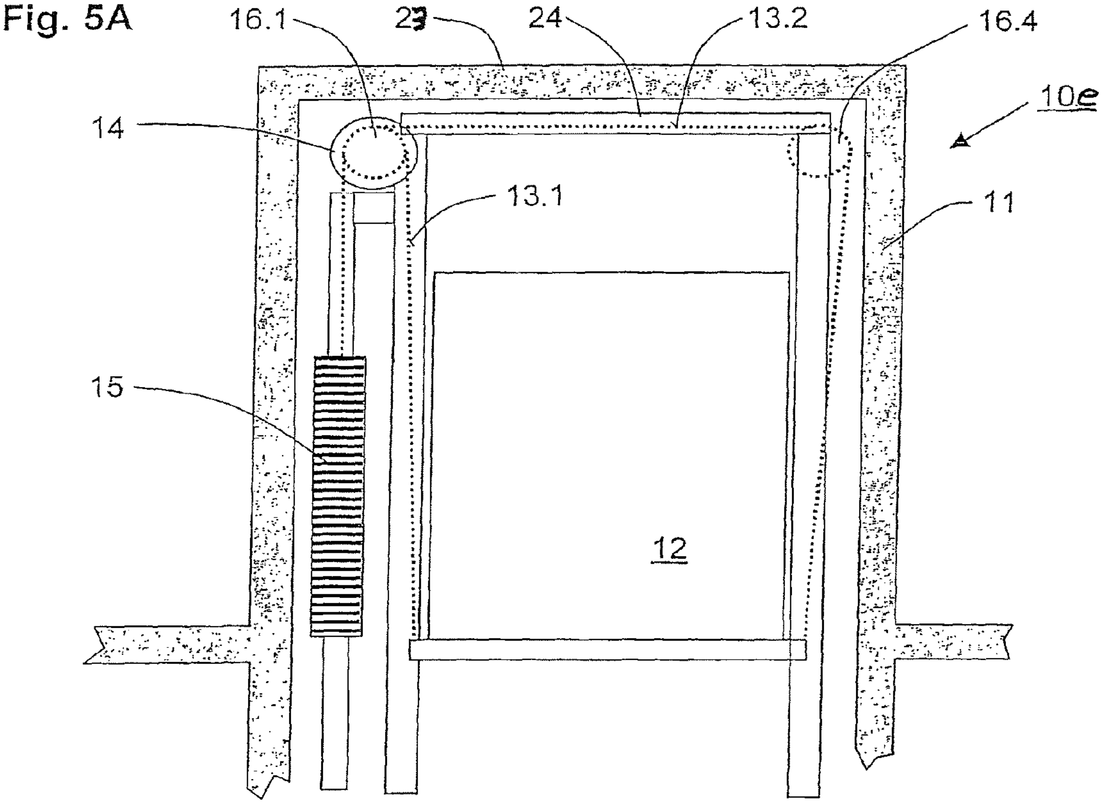
FIG. 5A is a schematic sectional rear elevation view of a fifth embodiment of an elevator system according to the present invention with a wedge-ribbed belt as a transmission means.
Figure 5B:
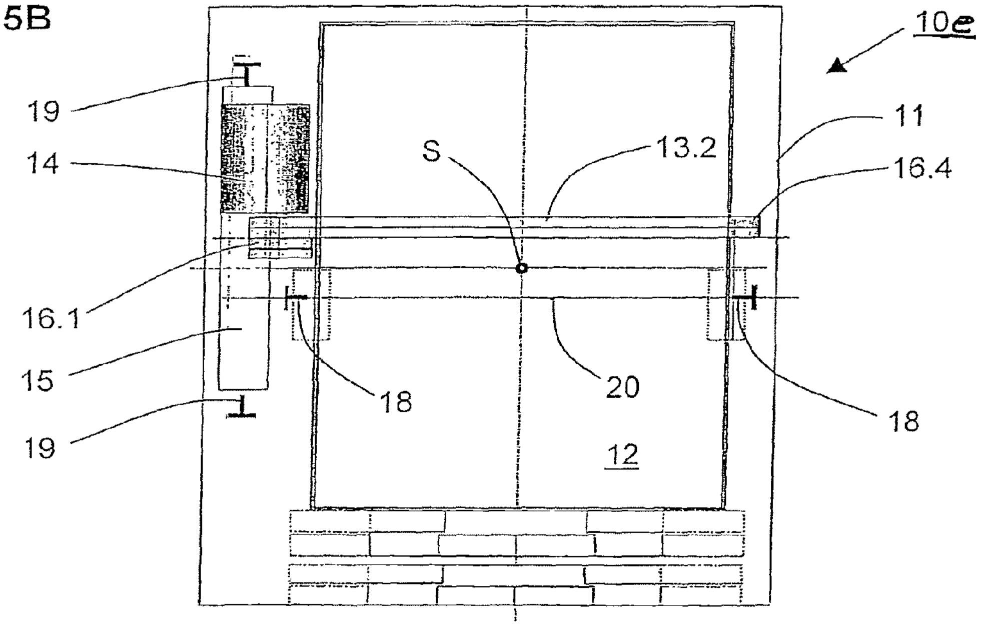
FIG. 5B is a schematic bottom plan view of the elevator system shown in FIG. 5A.

A fifth embodiment elevator system 10*e* is shown in FIGS. 5A and 5B. The drive 14 is arranged outside the car projection above the upper end position of the counterweight 15. The drive 14 can, as also in the foregoing examples, comprise a synchronous or an asynchronous motor. The drive 14 is preferably placed on a beam which rests on or at the guide rails 18 of the car 12 and the guides 19 for the counterweight 15. In this embodiment, the car 12 and the counterweight 15 are suspended 1:1. The wedge-ribbed belt transmission means 13 is arranged half on the left and half on the right of the elevator car 12. The first half 13.1 of the wedge-ribbed belt transmission means 13 leads from the counterweight 15 over the drive pulley 16.2 to a fixing point present at the elevator car 12 in the vicinity of the floor. The second half 13.2 of the wedge-ribbed belt transmission means 13 leads from the counterweight 15 over the drive pulley 16.1 along a shaft roof 21 above the car 12. There it is deflected by a deflecting pulley 16.4 and led to a second fixing point present at the elevator car 12 in the vicinity of the floor. The two guide rails 18 are preferably connected together at the upper end (for example, by way of a transverse beam 24) in order to accept the horizontally directed belt force. The wedge-ribbed belt transmission means 13 and the guide plane 20 of the elevator car 12 are arranged symmetrically with respect to the axis with the car center of gravity S. The spacing of the guide plane 20 from this axis is small in order to keep the guide forces, on the one hand in normal operation and on the other hand on engagement of a safety brake device, small.

Figure 5C:
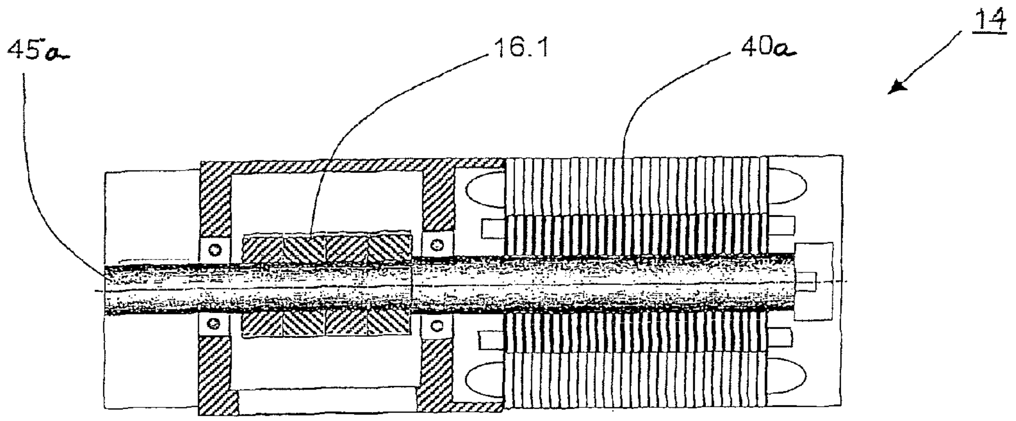
FIG. 5C is schematic sectional side elevation view of a motor suitable for use as a drive for the elevator system shown in FIGS. 5A and 5B.

In FIG. 5C there are shown details of the drive 14 which is a component of an elevator system, which is without an engine room, according to FIGS. 5A and 5B. The drive 14 comprises a motor 40*a* which is connected by a shaft 45*a* with the drive pulley 16.1. The illustrated drive 14 is very compact. The wedge-ribbed belt 13 can loop around the drive pulley 16.1 by 180° or only by 90°, depending on the direction in which the wedge-ribbed belt is to be led away from the drive pulley 16.1.

Figure 6A:
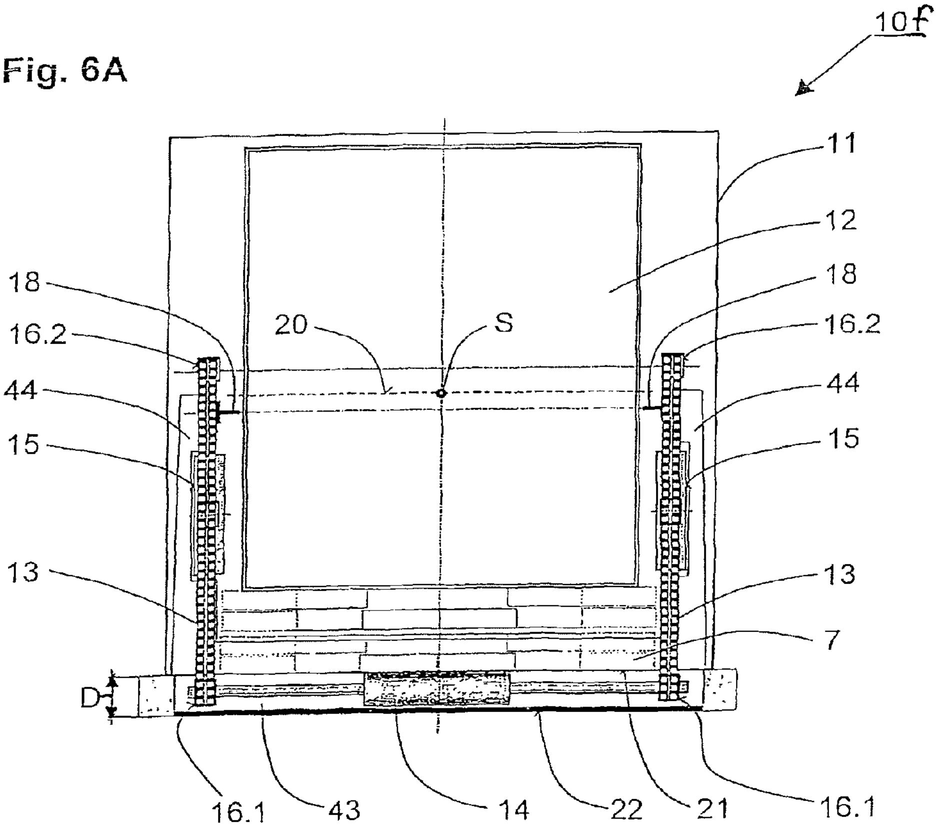
FIG. 6A is a schematic top plan view of a sixth embodiment of an elevator system according to the present invention two wedge-ribbed belts as a transmission means.
Figure 6B:
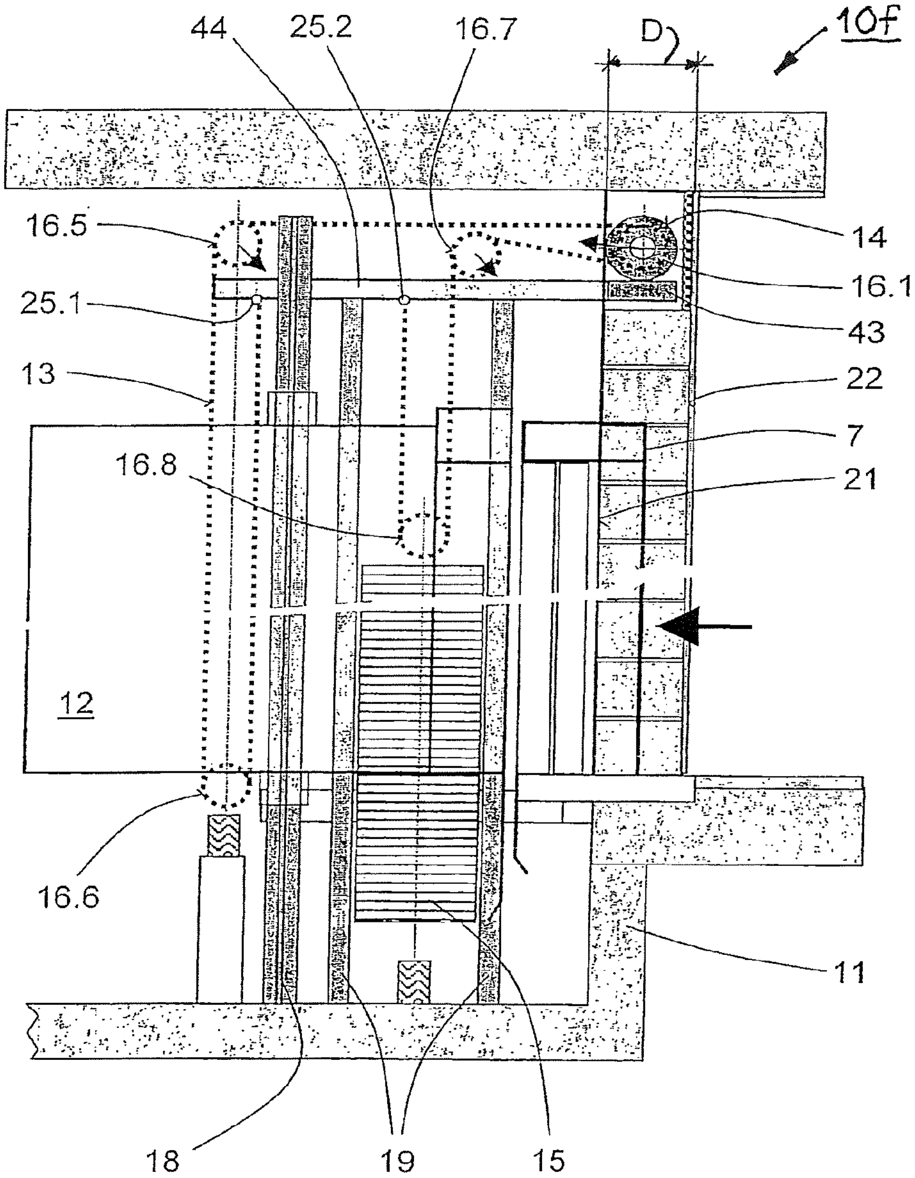
FIG. 6B is a schematic sectional side elevation view of the elevator system shown in FIG. 6A.

A sixth embodiment elevator system 10*f* is shown in FIGS. 6A and 6B. The drive 14 is arranged above the elevator shaft door 7 between a shaft inner wall 21 and a shaft outer wall 22. This is possible without further measures, since the diameter of the drive 14 is smaller than a shaft wall thickness D. The drive 14 can, as in the case of the other forms of embodiment, be designed as a synchronous or an asynchronous motor. Advantageously, a small mass system, i.e., a drive with a low mass moment of inertia, is used as the drive. The drive is provided at each of the two ends with a respective drive pulley 16.1. Not only the drive pulleys 16.1, but also the drive 14 can be fastened to a common support 43. The system 10*f* is equipped with two counterweights 15 which are each arranged on a respective side of the elevator car 12. The wedge-ribbed belt transmission means 13 are arranged symmetrically on the left hand and the right hand side of the elevator car 12. First runs of the wedge-ribbed belt transmission means 13 lead out from the drive pulleys 16.1 to first deflecting pulleys 16.5 fixedly mounted at the same height, out from these downwardly to deflecting pulleys 16.6 mounted on both sides of the elevator car 12, loop around these and lead upwardly to fixing points 25.1. Second runs of the wedge-ribbed belt transmission means 13 lead from the drive pulleys 16.1 out to second deflecting pulleys 16.7 fixedly mounted at the same height, out from these downwardly to deflecting pulleys 16.8 mounted at the counterweights 15, loop around these and lead upwardly to fixing points 25.2.

Above the space occupied by the counterweight 15 in its uppermost position there are mounted on both sides of the elevator car 12 a respective beam 44 on the counterweight guide rails 19 and the car guide rails 18, which beams 44 carry the deflecting pulleys 16.5 and 16.7 as well as the fixing points 25.1 and 25.2. The beams 44 can form, together with the support 43 of the drive 14, a U-shaped support structure. Horizontally and vertically acting forces are thus not transmitted to the elevator shaft structure. The car guide rails 18 and the deflecting pulleys 16.6 fastened to the elevator car 12 are arranged, in the direction of the car depth, as close as possible to the car center of gravity S, so that the guide forces in normal operation as also in safety braking remain small.

Figure 6C:
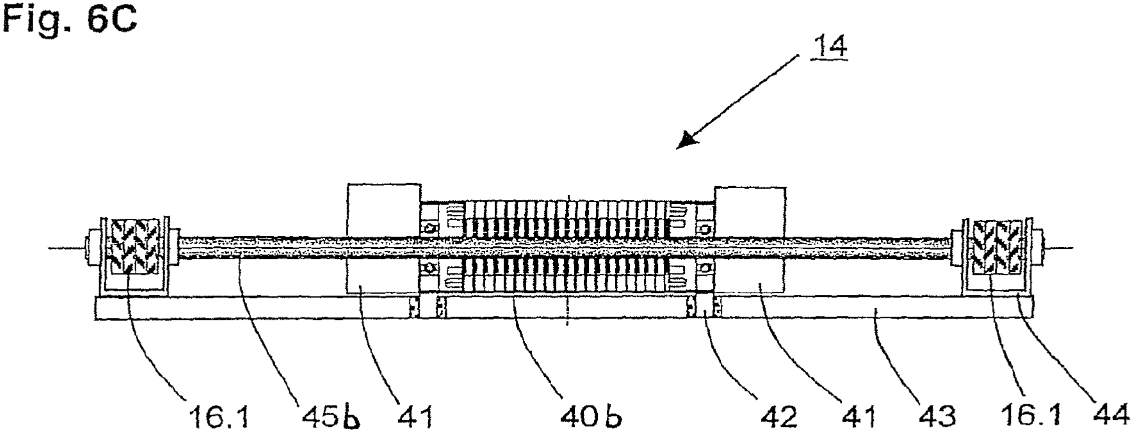
FIG. 6C is a schematic sectional side elevation view of a first motor suitable for use as a drive for the elevator system shown in FIGS. 6A and 6B.

In FIG. 6C there are shown details of a first alternate embodiment drive 14 which is a component of the elevator system 10*f*, without an engine room, according to FIGS. 6A and 6B. The drive 14 comprises a motor 40*b* and one or two brakes 41. The two drive pulleys 16.1 are connected by the carrier elements 44 with the support 43. Insulated torque supports 42 serve for fastening the motor 40*b* to the support 43. A shaft 45*b* is constructed to be continuous. The illustrated drive has low rotating masses and, due to its small constructional size, is suitable for installation in the elevator shaft.

Figure 6D:
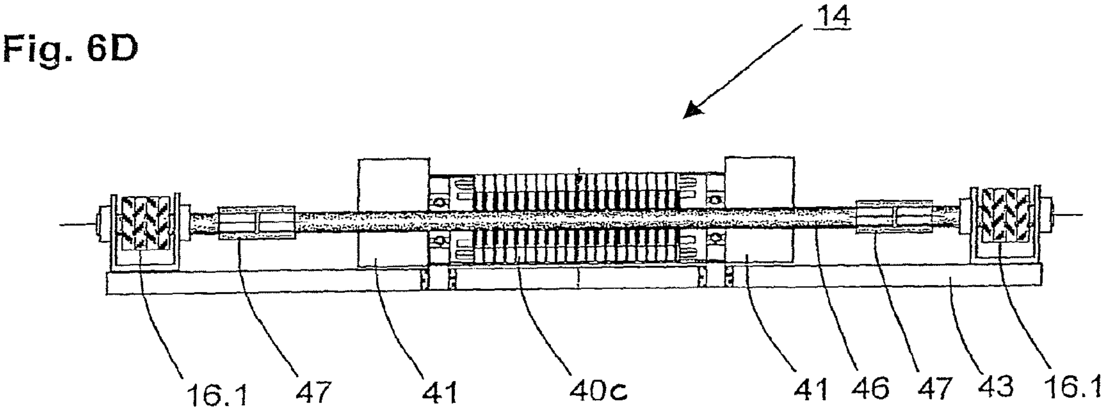
FIG. 6D is a schematic sectional side elevation view of a second motor suitable for use as a drive for the elevator system shown in FIGS. 6A and 6B.

In FIG. 6D there are shown details of a second alternate embodiment drive 14 which is a component of the elevator system 10*f*, without an engine room, according to FIGS. 6A and 6B. The illustrated drive 14 has a divided shaft 46 which is provided with two coupling elements 47. This drive otherwise corresponds with the drive 14 shown in FIG. 6D. Maintenance of the drive 14 can be carried out from the shaft interior.

Figure 7A:
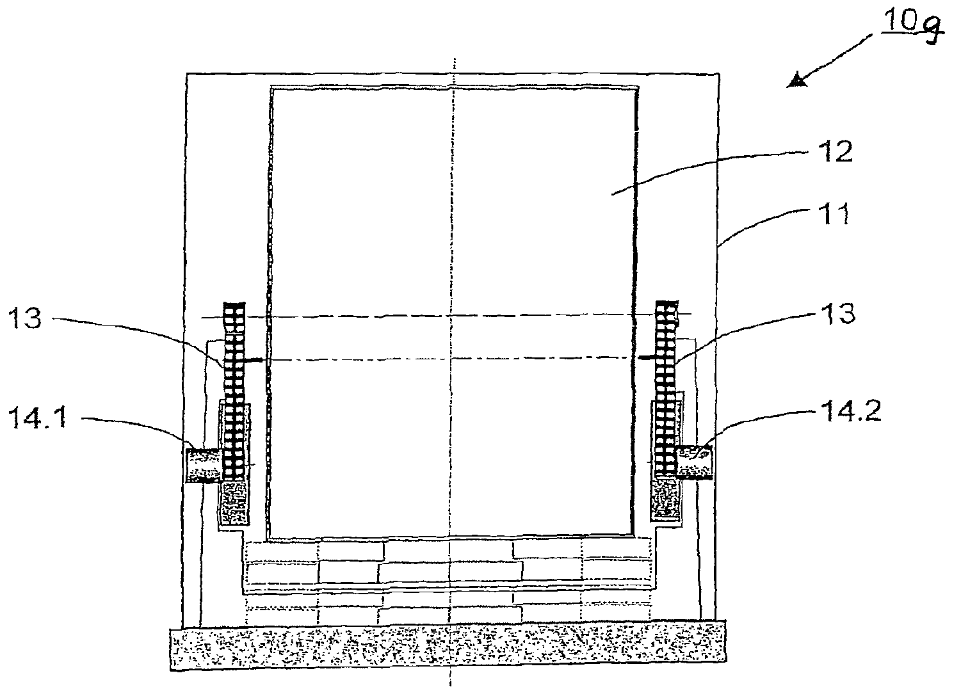
FIG. 7A is a schematic top plan view of a seventh embodiment of an elevator system according to the present invention two wedge-ribbed belts as a transmission means.
Figure 7B:
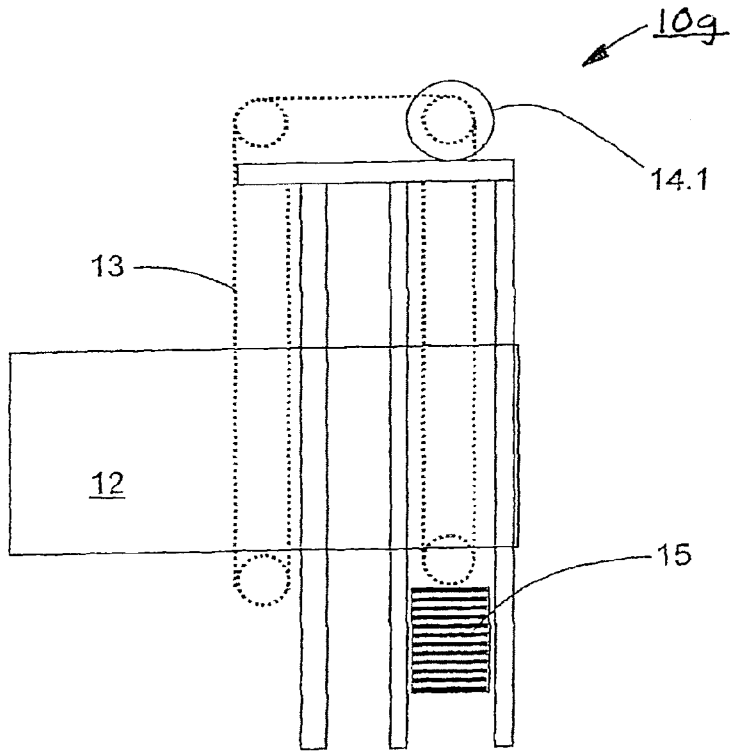
FIG. 7B is a schematic sectional side elevation view of the elevator system shown in FIG. 7A.

A development of the embodiment according to FIGS. 6A and 6B is shown in FIGS. 7A and 7B. This seventh embodiment elevator system 10*g* differs in that two separate drives 14.1 and 14.2 are provided. The car 12 and the counterweights 15 are suspended 2:1. The side view in FIG. 7B shows the bending, which is always in the same sense, of the wedge-ribbed belt transmission means 13, which counteracts premature wear thereof.

In the case of the previously described embodiments of the elevator system according to the present invention, the function of the drive and the function of the support are combined in each instance. For this reason the term transmission means was also used for reference to the function of the wedge-ribbed belt.

In the following embodiments, the function of the support and the function of the drive are constructed separately. In other words, there are separate support means and drive means.

Figure 8:
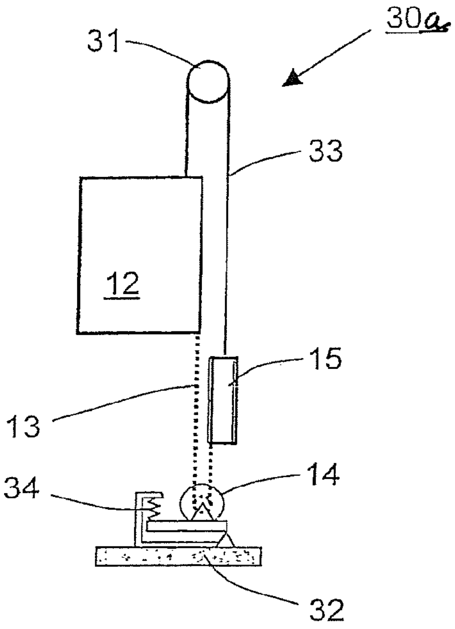
FIG. 8 is a schematic front elevation view of an eighth embodiment of an elevator system according to the present invention with a wedge-ribbed belt as a drive means and a separate support means.

FIG. 8 shows a ninth embodiment elevator system 30*a* that is a divided function system. The car 12 and the counterweight 15 are connected together by support means 33 in the form of cables (for example steel cables, aramide cables), flat belts, cogged belts or chains. A deflecting pulley 31 is provided at the shaft head and can be supported on the guide rails (not illustrated). The drive 14 is disposed at a shaft base 32. The drive 14 moves the car 12 by means of the wedge-ribbed belt drive means 13. The wedge-ribbed belt drive means 13 is connected at one end with the lower side of the counterweight 15. The necessary clamping force can be produced, for example, by means of a compression spring 34 or by a corresponding counterweight (not shown).

Figure 9:
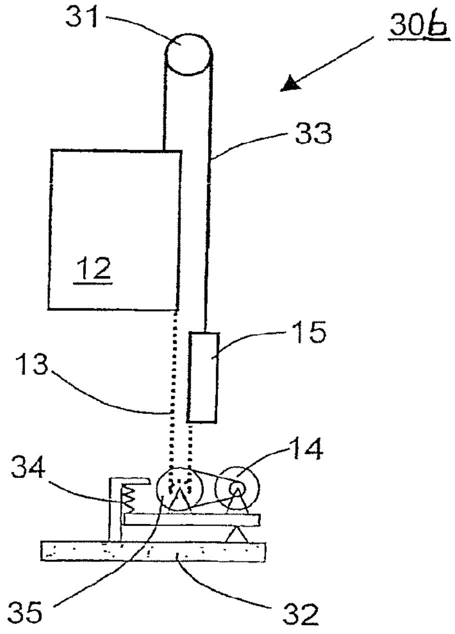
FIG. 9 is a schematic front elevation view of a ninth embodiment of an elevator system according to the present invention with a wedge-ribbed belt as a drive means and a separate support means.

A second divided function, tenth embodiment elevator system 30*b* shown in FIG. 9 substantially corresponds with the embodiment shown in FIG. 8. A difference is that the drive 14 has a speed reduction means 35. Thus a smaller drive 14 can be used. The drive 14 can be coupled with the speed reduction means 35 by way of a V-belt or a similar means.

Figure 10A:
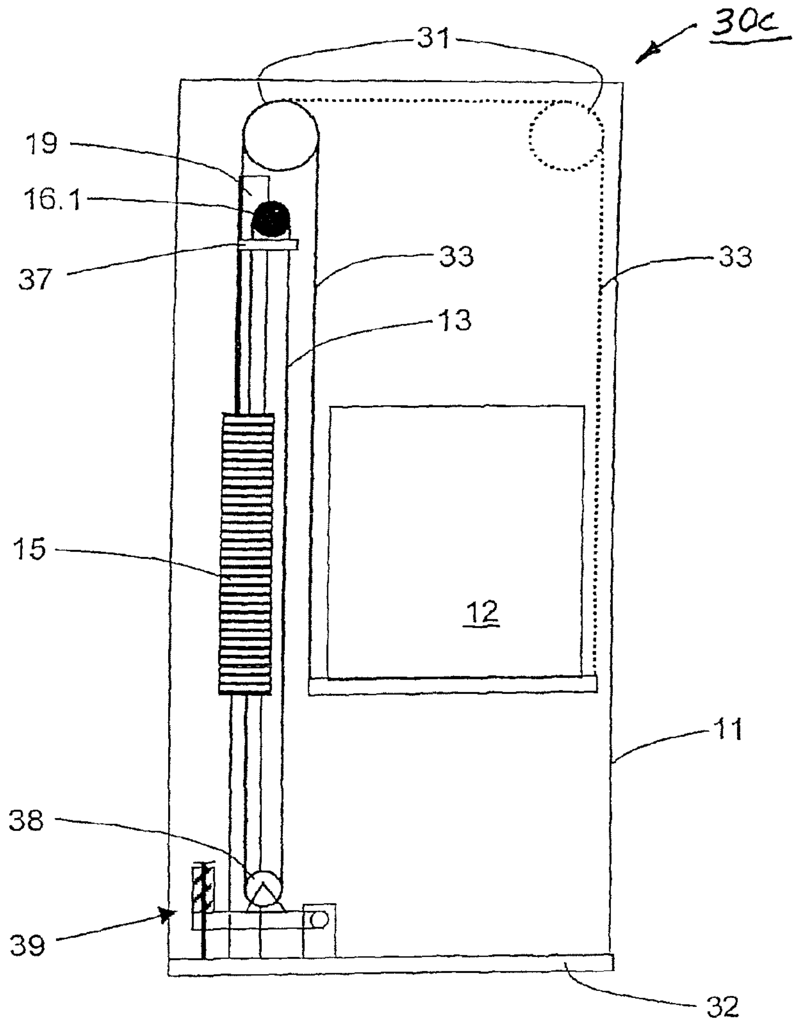
FIG. 10A is a schematic sectional rear elevation view of a tenth embodiment of an elevator system according to the present invention with two wedge-ribbed belts as a transmission means.
Figure 10B:
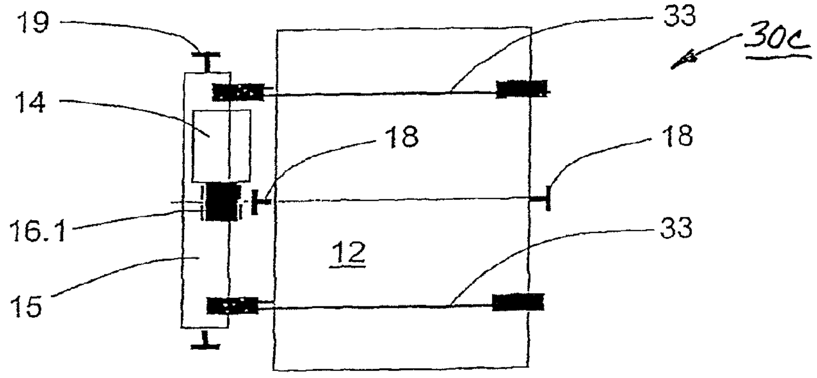
FIG. 10B is a schematic bottom plan view of the elevator system shown in FIG. 10A.

A third divided function, eleventh embodiment elevator system 30*c* of the present invention is shown in FIGS. 10A and 10B. The counterweight 15 is connected with the elevator car 12 1:1 by way of the support means 33 and several of the deflecting pulleys 31. The support means 33 can be fastened either only on the left to the elevator car 12 (as shown) or at both sides of the elevator car 12 (dashed-line illustration). These connections fulfill a pure supporting function. The drive 14 is disposed above the counterweight 15 and is carried by a support 37 preferably fastened to the guide rails 18, 19. The counterweight 15 compensates for 100% of the car weight and a part of the useful load. A wedge-ribbed belt 13 is directly fastened at the top to the counterweight 15 (suspension 1:1), deflected through 180° over the drive pulley 16.1 and led to a tensioning roller 38 disposed at the shaft base 32. The tensioning roller 38 deflects the wedge-ribbed belt 13 again through 180°, whereafter this is led upwardly to the lower end of the counterweight 15 and is fastened there. The tensioning roller 38 can be incorporated in a lever mechanism 39 which tightens the wedge-ribbed belt 13 by means of a spring or weight force.

The embodiment according to FIGS. 10A and 10B can be modified in that, for example, the wedge-ribbed belt 13 is so guided by suitable arrangement of pulleys that it forms a so-termed 2:1 suspension, by way of which the drive 14 drives the counterweight 15 (as described in connection with FIG. 1A). The necessary maximum torque of the drive can thus be halved.

Figure 11:
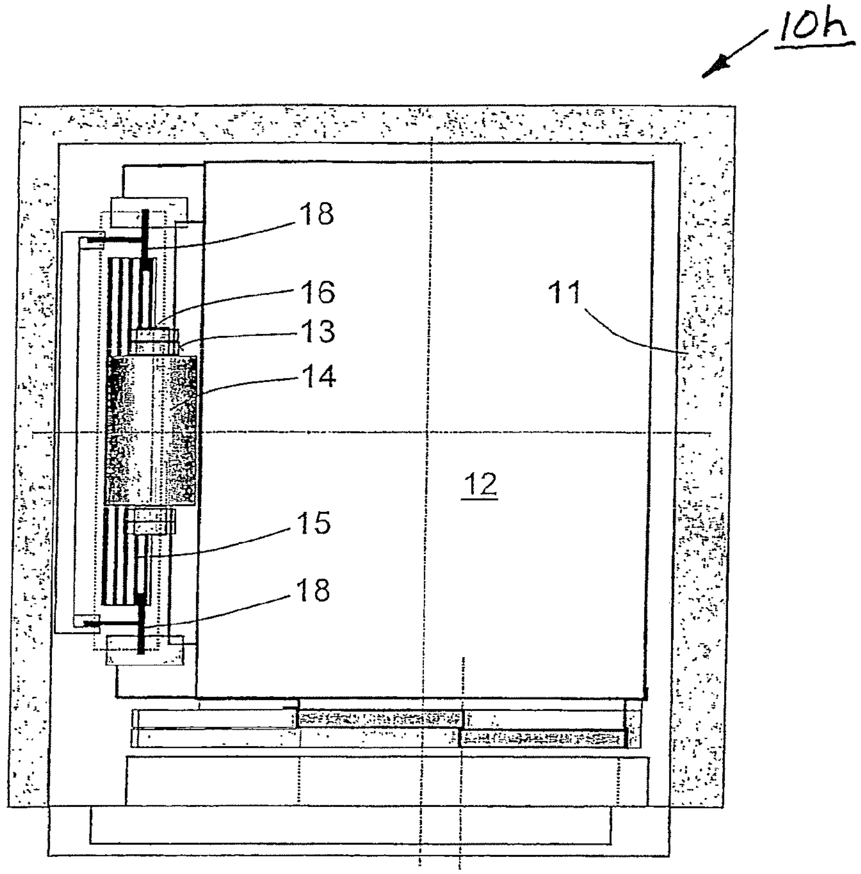
FIG. 11 is a schematic top plan view of an eleventh embodiment of an elevator system according to the present invention.

An eleventh embodiment elevator system 10*h* is shown in FIG. 11. The drive 14 is disposed, in the case of the illustrated example, between the elevator car 12 and the wall of the shaft 11. The elevator car 12 and the counterweight 15 are guided on common guide rails 18. For this purpose, these rails have a special profile. Drive pulleys 16.1 can be provided either on both sides of the drive 14 or only on one side of the drive 14. In FIG. 11 there is illustrated a 1:1 suspension. An embodiment with 2:1 suspension is possible if the wedge-ribbed belts 13 are, as illustrated by way of example in FIG. 1, led under the elevator car 12 and fixed on the other car side in the shaft head.

Figure 12:
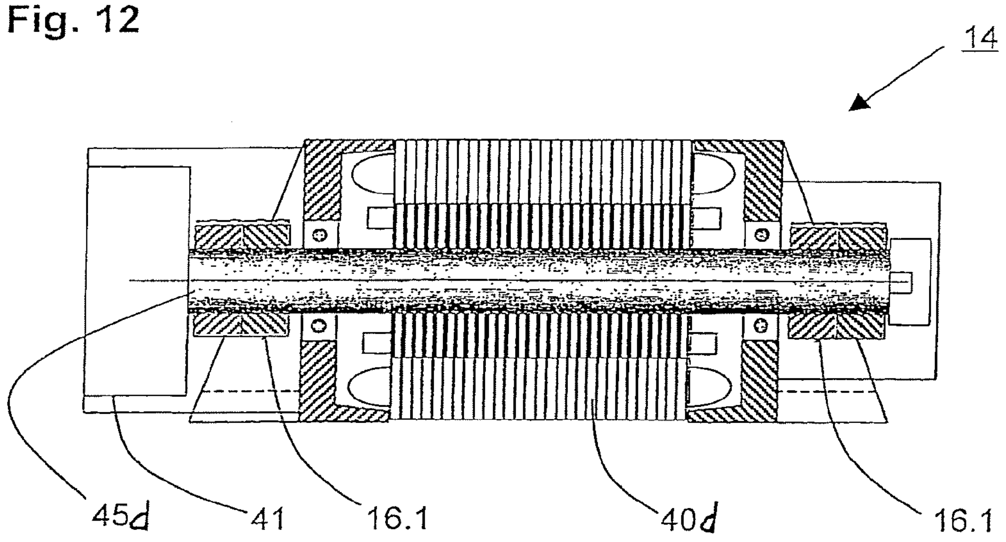
FIG. 12 is a schematic side elevation view of an alternate embodiment motor which is suitable as a drive for the elevator systems according to the present invention.

A further embodiment compact drive 14 is shown in FIG. 12. This drive 14 is distinguished by the fact that it comprises two of the drive pulleys 16.1. The drive 14 additionally comprises a motor 40*d*, the brake 41 and a continuous shaft 45*d*. The two drive pulleys 16.1 are each seated at a respective end of the shaft 45*d*. The drive 14 is particularly designed for installation to lie laterally above the car 12.

In a further embodiment the wedge-ribbed belt 13 has teeth which are constructed to be highly wear-resistant. According to the present invention either the stationary drive 14 is accommodated in an engine room or the drive is disposed in or at the elevator shaft.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A transmission means for at least one of driving and supporting an elevator car comprising:

a longitudinally extending body having two remote ends;

said body having a front side with a front side surface adapted to engage a drive pulley rotated by an elevator drive;

said front side surface having formed therein several wedge-shaped grooves alternating with wedge ribs, said wedge grooves and said wedge ribs being arranged in parallel in a longitudinal direction of said body;

said wedge grooves having a wedge groove angle and said wedge ribs having a wedge rib angle, wherein said wedge groove angles and said wedge rib angles are in a range of 80 degrees to 100 degrees, and wherein each said wedge groove angle is defined by a pair of intersecting planes corresponding with opposing flank surfaces of adjoining wedge ribs, one of the planes oriented parallel with one of the opposing flank surfaces and another of the planes oriented parallel with another of the opposing flank surfaces;

said front side enhancing a cable force when running over an elevator pulley having a complementary surface maintaining said wedge groove angles and said wedge rib angles in the range of 80 degrees to 100 degrees; and said body further comprising a rear side including a slide layer, wherein said slide layer has better sliding characteristics than said front side when said slide layer is in contact with another pulley.

2. The transmission means according to claim 1 wherein the transmission means is formed as a flat belt comprising:

said two remote ends of said longitudinally extending body being adapted to be fixed in an elevator hoistway;

said front side of said body including a friction layer formed of an elastomeric material; and said slide layer being a fabric layer having better sliding characteristics than said front side when in contact with another pulley.

3. The transmission means according to claim 2 comprising:

said longitudinally extending body being formed of a polyurethane material or Nitril Butadiene Rubber (NBR); and said body including at least one planar tensile member extending substantially over an entire length and width of said body to form a tensile layer.

4. The transmission means according to claim 3 comprising:

at least one intermediate layer arranged between said tensile layer and one of said friction layer and slide layer.

5. The transmission means according to claim 1 comprising:

said two remote ends of said longitudinally extending body being adapted to be fixed in an elevator hoistway; and said front side of said body including a friction layer enhancing the cable force when running over the elevator pulley.

6. The transmission means according to claim 1 comprising:

said front side including a friction layer formed of an elastomeric material;

said body including a plurality of tensile members oriented in a longitudinal direction of said body and formed of metallic or non-metallic strands; and said slide layer being a fabric slide layer.

7. The transmission means according to claim 1 wherein said body is formed of Nitril Butadiene Rubber (NBR) or a polyurethane material and has embedded therein at least one tensile carrier formed of a non-metallic material and extending longitudinally through said body.

8. The transmission means according to claim 1 wherein a plurality of tensile carriers formed of non-metallic or metallic strands are embedded in a longitudinal direction in said body, and said slide layer is a fabric layer.

9. The transmission means of claim 1, wherein each said wedge groove angle is defined by the opposing flank surfaces of the adjoining wedge ribs, the opposing flank surfaces intersecting at a base of the respective wedge groove.

10. A transmission means for at least one of driving and supporting an elevator car comprising:

a longitudinally extending body having two remote ends;

said body having a front side with a front side surface adapted to engage a drive pulley rotated by an elevator drive;

said front side including at least one wedge-shaped groove between two wedge ribs, wherein said at least one wedge-shaped groove and said wedge ribs are arranged in parallel in a longitudinal direction of said body;

said at least one wedge groove having a wedge groove angle and said wedge ribs having a wedge rib angle, wherein said wedge groove angle and said wedge rib angles are in a range of 80 degrees to 100 degrees when engaged with a surface of the drive pulley, the surface of the drive pulley maintaining said wedge groove angles and said wedge rib angles in the range of 80 degrees to 100 degrees, and wherein each said wedge groove angle is defined by a pair of intersecting planes corresponding with opposing flank surfaces of adjoining wedge ribs, one of the planes oriented parallel with one of the opposing flank surfaces and another of the planes oriented parallel with another of the opposing flank surfaces;

said body further comprising a rear side including a slide layer;

said slide layer having better sliding characteristics than said front side when in contact with another pulley; and wherein said body contains at least one strand-shaped tensile carrier extending longitudinally through said body.

11. The transmission means according to claim 10 wherein said body is formed of a polyurethane material and said rear side is provided with a longitudinally extending guide rib.

12. A transmission means for at least one of driving and supporting an elevator car comprising:

a longitudinally extending body having two remote ends;

said body having a front side with a front side surface adapted to engage a drive pulley rotated by an elevator drive;

said front side including several wedge-shaped grooves alternating with wedge ribs, said grooves and said ribs being arranged in parallel in a longitudinal direction of said body;

said wedge grooves having a wedge groove angle and said wedge ribs having an according wedge rib angle;

wherein said wedge groove angles and said wedge rib angles are in a range of 80 degrees to 100 degrees when in contact with a surface of the drive pulley, the surface of the drive pulley maintaining said wedge groove angles and said wedge rib angles in the range of 80 degrees to 100 degrees, and wherein each said wedge groove angle is defined by a pair of intersecting planes corresponding with opposing flank surfaces of adjoining wedge ribs, one of the planes oriented parallel with one of the opposing flank surfaces and another of the planes oriented parallel with another of the opposing flank surfaces;

said body further comprising a rear side including a slide layer; and said slide layer having better sliding characteristics than said front side when said slide layer is in contact with another pulley.

13. The transmission means according to claim 12 formed as a wedge-ribbed belt and further comprising a plurality of tensile carriers embedded within said body and forming at least 20% of a volume of said body.

14. An elevator system with a drive including a drive pulley, which drive co-operates by way of a transmission means with an elevator car and a counterweight in order to move the elevator car and the counterweight in an elevator shaft by transmission of a force, comprising:

the transmission means having an elongated body with two remote ends;

said body having a front side contacting the drive pulley, said front side including several wedge-shaped grooves alternating with wedge ribs, said grooves and said ribs being arranged in parallel in a longitudinal direction of said body;

said wedge grooves having a wedge groove angle and said wedge ribs having a wedge rib angle wherein said wedge groove angles and said wedge rib angles are in a range of 80 degrees to 100 degrees when in contact with a surface of the drive pulley, the surface of the drive pulley maintaining said wedge groove angles and said wedge rib angles in the range of 80 degrees to 100 degrees, and wherein each said wedge groove angle is defined by a pair of intersecting planes corresponding with opposing flank surfaces of adjoining wedge ribs, one of the planes oriented parallel with one of the opposing flank surfaces and another of the planes oriented parallel with another of the opposing flank surfaces;

said body having a rear side including a slide layer; and said slide layer having better sliding characteristics than said front side when said slide layer is in contact with another pulley of the elevator system.

15. The elevator system according to claim 14 wherein said wedge groove angles and said wedge rib angles are 90 degrees and said slide layer is a fabric layer.

16. The elevator system according to claim 14 wherein said body contains tensile carriers, which are oriented in a longitudinal direction of said body, and wherein a ratio between a total cross-section of said tensile carriers and a cross-section of said body is at least 20%.

17. The elevator system according to claim 14 wherein said body contains strand-shaped tensile carriers, which are oriented in a longitudinal direction of said body and are formed of a metallic material.

18. The elevator system according to claim 14 wherein said body contains tensile carriers, which are oriented in a longitudinal direction of said body and are formed of a non-metallic material.

19. The elevator system according to claim 14 wherein the transmission means leads from a first fixing point downwardly to a suspension pulley of the counterweight, the belt-like transmission means loops around said suspension pulley, the belt-like transmission means leads upwardly to the drive pulley and loops around the drive pulley, the belt-like transmission means leads downwardly to a first deflecting pulley mounted at and underneath the elevator car, the belt-like transmission means leads from said first deflecting pulley horizontally below the elevator car to a second deflecting pulley mounted at and underneath the elevator car, and the belt-like transmission means leads from said second deflecting pulley upwardly to a second fixing point.

20. The elevator system according to claim 14 wherein the transmission means is a flat belt and said front side is formed with a friction layer, said body includes a tensile layer and at least one intermediate layer; and wherein said at least one intermediate layer is arranged between said tensile layer and one of said friction layer and said slide layer.

* * * * *